United States Patent
Takahashi

(10) Patent No.: US 7,880,811 B2
(45) Date of Patent: Feb. 1, 2011

(54) SIGNAL SEPERATION CIRCUIT AND SIGNAL TRANSMISSION CIRCUIT

(75) Inventor: Kazunori Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1222 days.

(21) Appl. No.: 11/460,656

(22) Filed: Jul. 28, 2006

(65) Prior Publication Data

US 2007/0046814 A1   Mar. 1, 2007

(30) Foreign Application Priority Data

Aug. 31, 2005  (JP) .............................. 2005-250638

(51) Int. Cl.
*H04N 5/44* (2006.01)
*G09G 5/00* (2006.01)

(52) U.S. Cl. ........................ 348/552; 348/730; 348/734; 345/211

(58) Field of Classification Search ................ 348/552, 348/730, 734; 345/211
See application file for complete search history.

(56) References Cited

U.S. PATENT DOCUMENTS

| | | | | |
|---|---|---|---|---|
| 5,784,499 | A | | 7/1998 | Kuwahara et al. |
| 5,850,304 | A | * | 12/1998 | Elmers et al. ............... 398/107 |
| 5,880,721 | A | * | 3/1999 | Yen .............................. 725/81 |
| 6,008,777 | A | * | 12/1999 | Yiu ............................. 345/2.1 |
| 6,084,638 | A | * | 7/2000 | Hare et al. ................... 348/552 |
| 6,239,845 | B1 | * | 5/2001 | Itagaki et al. ............... 348/552 |
| 6,285,406 | B1 | * | 9/2001 | Brusky ........................ 348/552 |
| 6,377,861 | B1 | * | 4/2002 | York .............................. 700/83 |
| 6,516,487 | B1 | * | 2/2003 | Gleason ........................ 14/69.5 |
| 6,545,722 | B1 | * | 4/2003 | Schultheiss et al. ......... 348/552 |
| 6,625,738 | B1 | * | 9/2003 | Shiga .......................... 713/310 |
| 6,633,583 | B1 | * | 10/2003 | Esterson ...................... 370/466 |
| 6,633,934 | B1 | * | 10/2003 | Thornton ..................... 710/100 |
| 6,898,763 | B2 | * | 5/2005 | Hagiwara et al. ............ 715/716 |
| 6,967,588 | B2 | * | 11/2005 | Zustak et al. ........... 340/825.22 |
| 6,980,150 | B2 | * | 12/2005 | Conway et al. .............. 341/176 |
| 6,993,722 | B1 | * | 1/2006 | Greer et al. .................. 715/739 |
| 7,098,968 | B2 | * | 8/2006 | Wang et al. .................. 348/734 |
| 2006/0288388 | A1 | * | 12/2006 | Harris et al. ................... 725/81 |

FOREIGN PATENT DOCUMENTS

| | | |
|---|---|---|
| JP | 50-74372 | 6/1975 |
| JP | 55-004110 | 1/1980 |
| JP | 58-164342 | 9/1983 |
| JP | 07-288768 | 10/1995 |
| JP | 11-27559 | 1/1999 |
| JP | 2005-10834 | 1/2005 |

OTHER PUBLICATIONS

Japanese Patent Office Action, mailed Jul 8, 2008, and issued in corresponding Japanese Patent Application No. 2005-250638.

* cited by examiner

*Primary Examiner*—Brian Yenke
(74) *Attorney, Agent, or Firm*—Fujitsu Patent Center

(57) ABSTRACT

In a signal separation circuit for separating a plurality of pulse signals received via the same signal line, a PC-on signal detection circuit detects a PC-on signal with a first pulse width from a PC/TV-on signal received via the signal line and generates a first corresponding output signal. A TV-on signal detection circuit detects a TV-on signal with a second pulse width shorter than the first pulse width from the PC/TV-on signal and generates a second corresponding output signal.

3 Claims, 11 Drawing Sheets

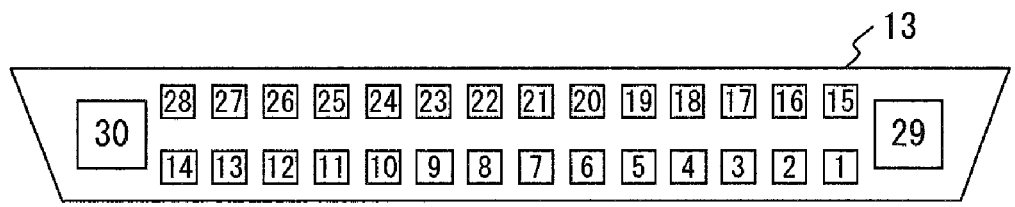
9: PC/TV-ON SIGNAL, 11,12: USB SIGNAL, OTHERS: POWER, GROUND, VIDEO SIGNAL, AUDIO SIGNAL, CONTROL SIGNAL, ETC.
F I G. 4

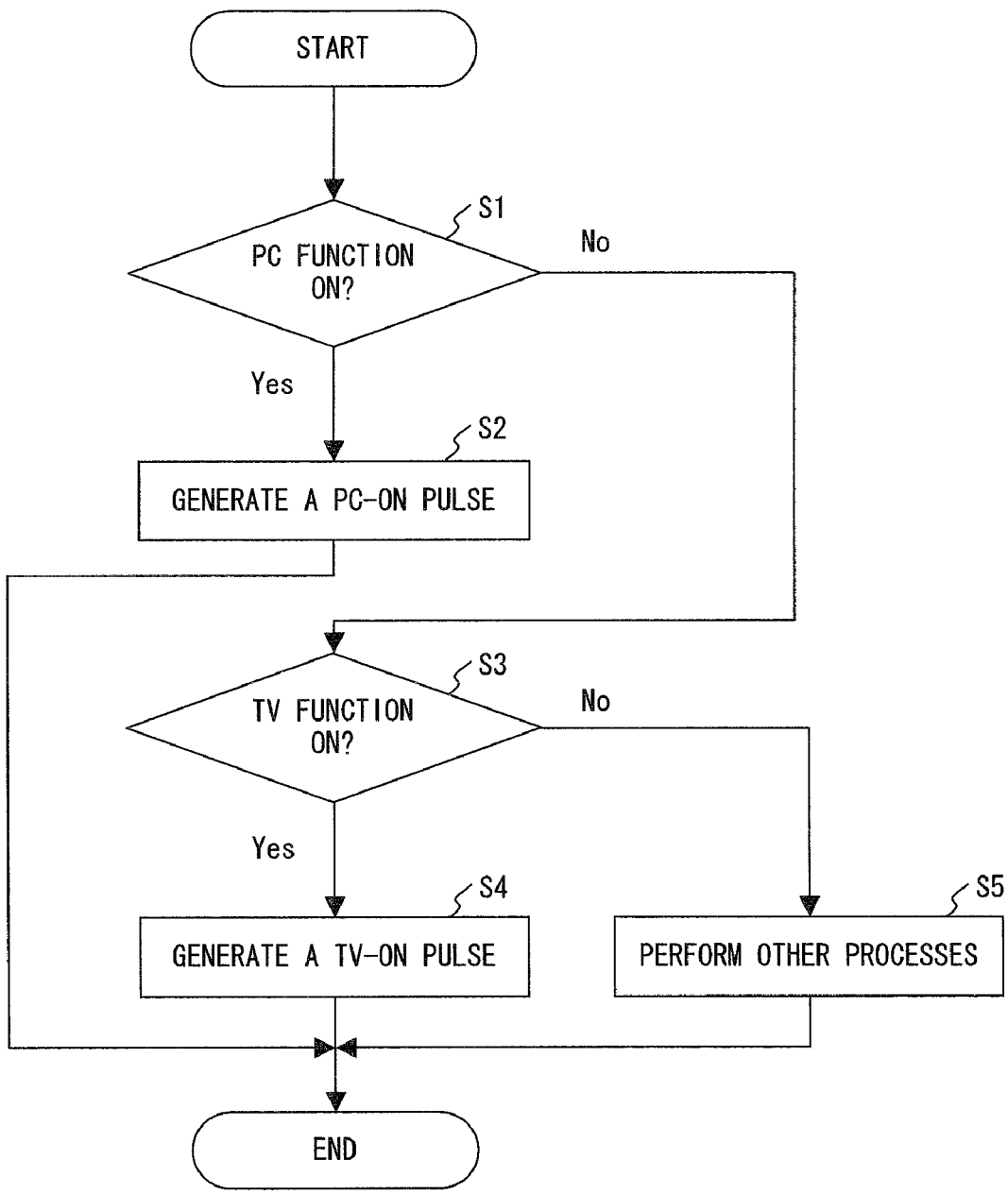
F I G. 5

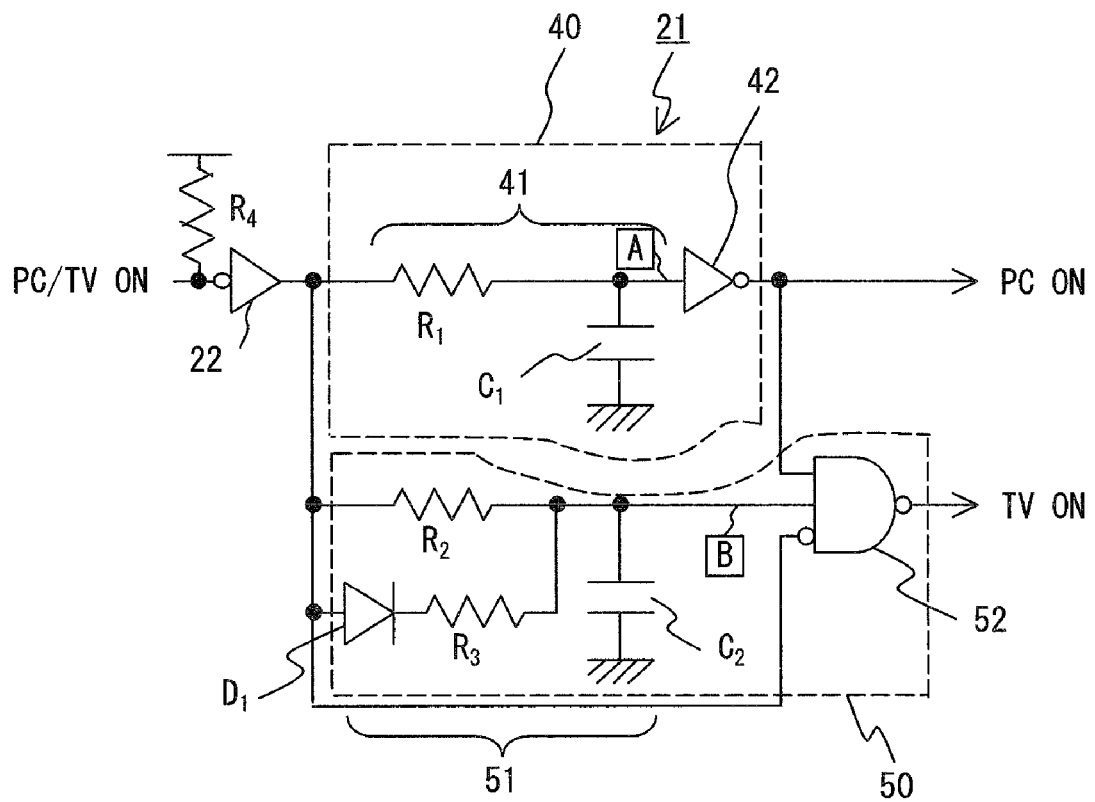
F I G. 6 B

| PC/TV-ON SIGNAL | PC ACTIVATION SIGNAL | OUTPUT SIGNAL B OF INTEGRATION CIRCUIT 51 | TV ACTIVATION SIGNAL |
|---|---|---|---|
| 0 | X | X | 1 |
| X | 0 | X | 1 |
| 1 | 1 | 0 | 1 |
| 1 | 1 | 1 | 0 |

F I G. 7

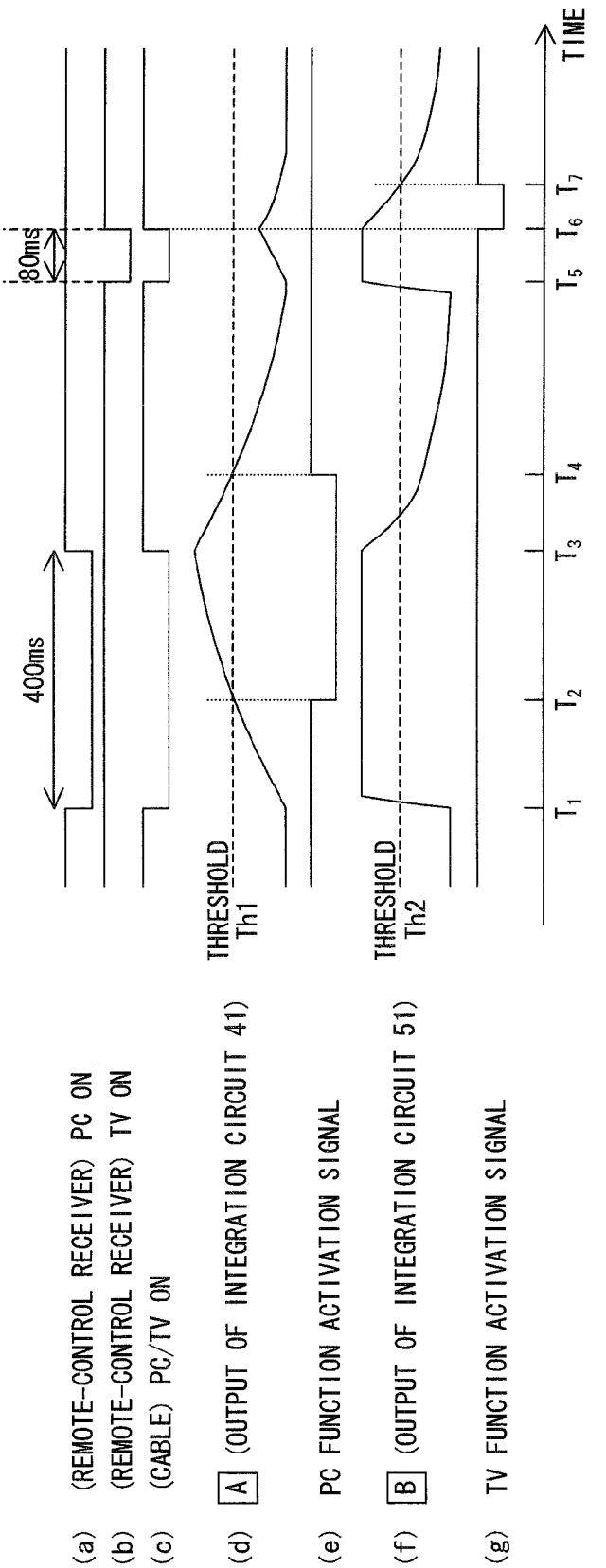
F I G. 8

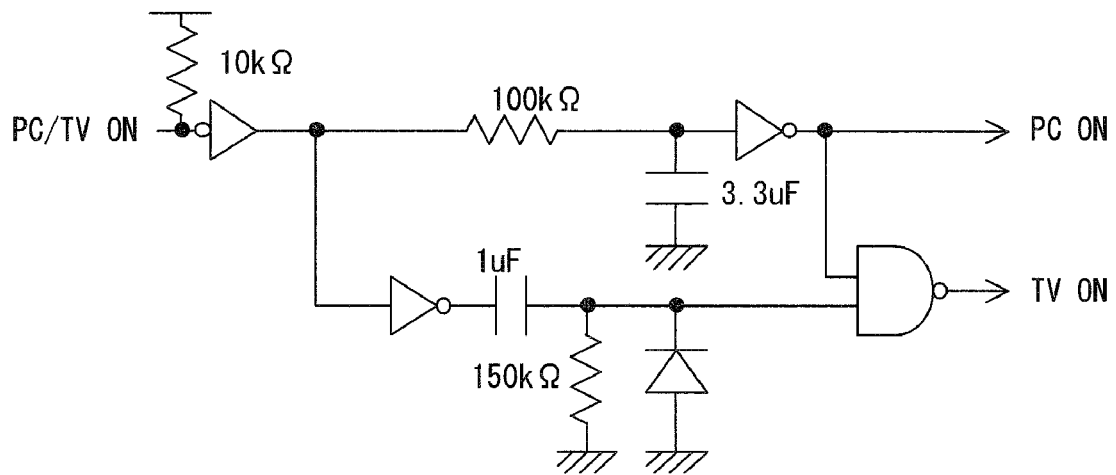
F I G. 9

SIGNAL SEPERATION CIRCUIT AND SIGNAL TRANSMISSION CIRCUIT

BACKGROUND OF THE INVENTION

1. Field of the Invention

The present invention relates to a technology for transmitting pulse signals, such as a power-on signal and the like.

2. Description of the Related Art

Recently, personal computers (hereinafter called "PC") provided with a television (hereinafter called "TV") function, have become widely spread. In such a PC, TV broadcast can be received independently of its PC function. A PC provided with a remote-control transmitter for transmitting a variety of instructions including power-on is also known of.

When switching the power of a PC on, a user presses a power button provided for the remote-control transmitter. In this case, a remote-control transmitter comprises a PC power button for activating a PC function and a TV power button for activating a TV function. Radio signals transmitted from the remote-control transmitter are received by a remote-control receiver. When detecting a signal from the remote-control transmitter, the remote-control receiver generates a PC-on signal for activating the PC function or a TV-on signal for activating the TV function. Then, the generated signal is transmitted to the PC main body via a signal line to activate the PC function or TV function.

FIGS. 1A and 1B show examples of the configuration of a conventional PC. FIG. 1A is an example of the configuration of a PC without a TV function. FIG. 1B is an example of the configuration of a PC with a TV function.

In a conventional PC with a TV function, a signal line for transmitting a TV-on signal from the remote-control receiver to the PC main body is provided separately from a signal line for transmitting a PC-on signal. Therefore, the same cable and connector cannot be commonly used for both a PC with a TV function and a PC without a TV function.

As to prior art for transmitting signals other than a PC power-on signal, Japanese Patent Applications No. H7-288768 (U.S. Pat. No. 5,784,499) and S55-4110 disclose a technology for transmitting a plurality of signals using the same signal line and a technology for separating signals transmitted via the same signal line.

SUMMARY OF THE INVENTION

It is preferable from the viewpoint of suppressing the production cost of a PC to be able to commonly use the same cable and connector for both a PC with a TV function and a PC without a TV function.

It is an object of the present invention to be able to transmit a plurality of signals via the same signal line.

One aspect of the present invention is a signal separation circuit for separating a plurality of signals received via the same signal line. To attain the above-mentioned objective, the signal separation circuit comprises a first circuit for detecting a first pulse signal with a first pulse width from a signal received via the signal line and generating a first corresponding output signal, a second circuit for detecting a second pulse signal with a second pulse width shorter than the first pulse width from the received signal and a third circuit for generating a second output signal from the first output signal and an output signal of the second circuit.

When receiving pulse signals each with a different pulse width, the first output signal corresponding to the first pulse signal is obtained from the first circuit and the second output signal corresponding to the second pulse signal is obtained from the third circuit, depending on the pulse width. That is, the output signal each corresponding to the first and the second pulse signals, which are transmitted via a signal line, is obtained.

The first circuit can also comprise a first integration circuit which is charged beyond a first threshold voltage by the first pulse signal and is not charged up to the first threshold voltage by the second pulse signal and a first output circuit for generating the first output signal when the first integration circuit is charged beyond the first threshold voltage. The second circuit can also comprise a second integration circuit which is charged beyond a second threshold voltage by the second pulse signal. The third circuit can also comprise a second output circuit for generating the second output signal if the first circuit does not generate the first output signal in the timing of the end edge of the input pulse signal which contributes to the charge of the second integration circuit after the second integration circuit is charged beyond the second threshold voltage.

Furthermore, the second output circuit can also be comprised of an AND circuit to which the output signal of the first integration circuit, the output signal of the second integration circuit and the received signal are inputted.

Furthermore, the first pulse signal can also be an activation signal for activating one of a personal computer and a TV receiver, and the second pulse signal can also be an activation signal for activating the other of the personal computer and the TV receiver.

Another aspect of the present invention is a signal transmission circuit for transmitting an activation signal to a personal computer provided with a TV reception function. The signal transmission circuit comprises a first signal generation unit for generating a first pulse signal with a prescribed pulse width when an instruction to activate a computer function is given, a second signal generation unit for generating a second pulse signal with a pulse width different from the first pulse width when an instruction to activate a television reception function is given and an OR circuit for outputting an output of the first signal generation unit and an output of the second signal generation unit to a signal line connected to the personal computer.

According to the present invention, a plurality of signals can be transmitted via the same signal line, thereby enabling the common use of components (such as a cable and a connector).

BRIEF DESCRIPTION OF THE DRAWINGS

FIG. 4 shows the typical pin array of a connector;

FIG. 5 is a flowchart showing the process performed by a remote-control receiver;

FIG. 6B shows the configuration of the signal separation circuit of the preferred embodiment;

FIG. 7 is the logical value table of the input/output signal of an NAND circuit;

FIG. 8 is a timing chart showing the operation of the signal separation circuit of the preferred embodiment; and FIG. 9 shows another configuration of the signal separation circuit.

DESCRIPTION OF THE PREFERRED EMBODIMENT

The preferred embodiments of the present invention are described in detail below with reference to the attached drawings.

Figure 1:
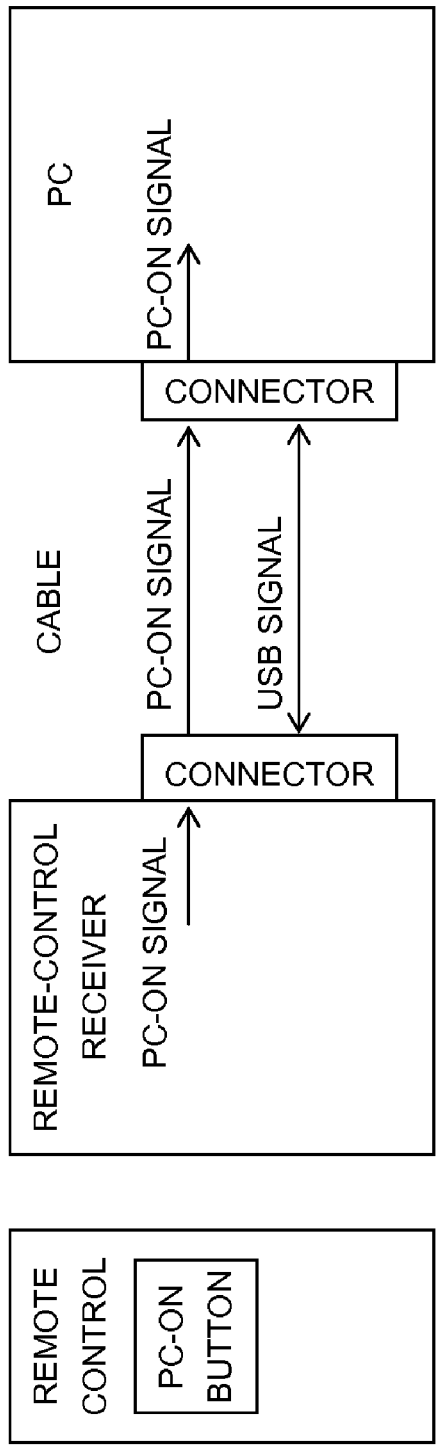
FIG. 1A shows an example of the configuration of a conventional PC (No. 1)
FIG. 1B shows an example of the configuration of a conventional PC (No. 2)
Figure 1B:
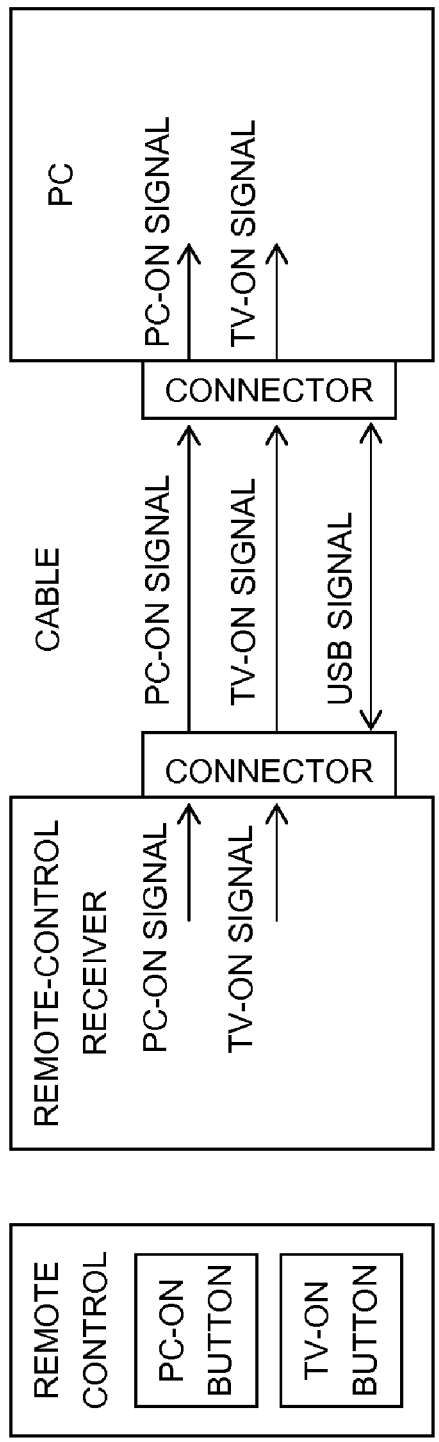
Figure 2:
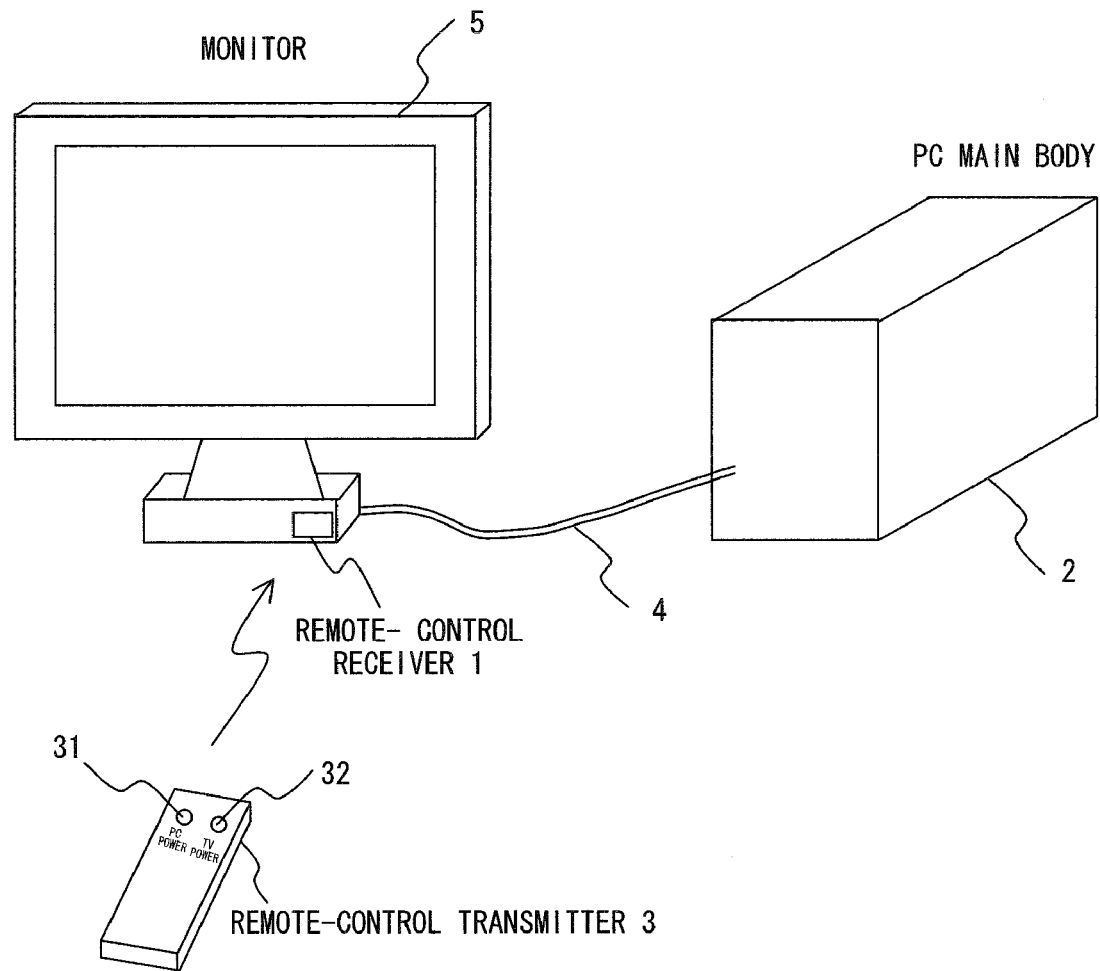
FIG. 2 shows the configuration of a PC system in which the signal transmission circuit and signal separation circuit of the present invention are adopted.

FIG. 2 shows the configuration of a PC system in which the signal transmission circuit and signal separation circuit of the present invention are adopted. A PC main body 2 and a monitor 5 are connected via a cable 4. The monitor 5 displays a TV picture received by the PC main body 2 as well as user interfaces, such as an application or the like, and its execution result and the like in the PC main body 2. A remote-control receiver 1 is built into the monitor 5. When receiving an instruction to switch the PC or TV on and any of other various operating instructions which are transmitted by a remote-control transmitter (remote controller), the remote-control receiver 1 transmits the instruction to the PC main body 2 via the cable 4. The PC main body 2 performs a process according to the given instruction. For example, if a user instructs a PC or a TV receiver to switch on by pressing a PC on button 31 or a TV on button 32, the PC function or TV function of the PC main body 2 is activated.

A method for transmitting a signal for instructing to switch the PC main body 2 on from the remote-control receiver 1 in the PC system configured as shown in FIG. 2 is described below with reference to the drawings. In the following description, the PC main body 2 is simply called "PC 2".

Figure 3:
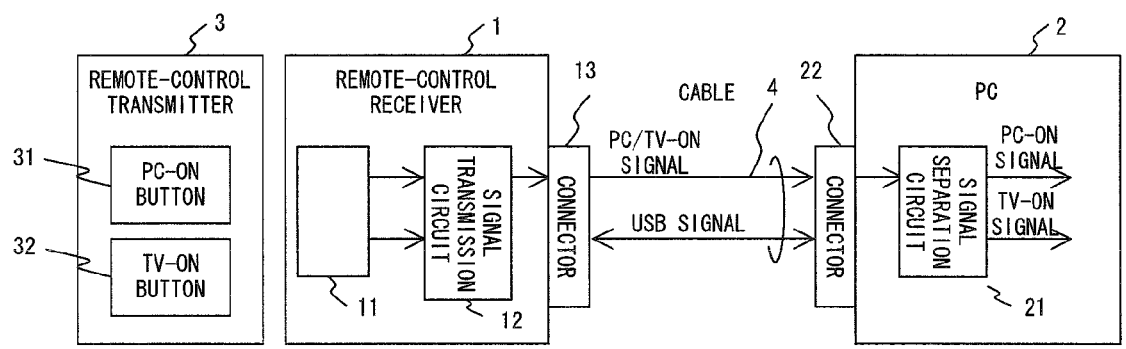
FIG. 3 shows the configuration of each device including the signal transmission circuit or signal separation circuit of the present invention.

FIG. 3 shows the configuration of each of devices including the signal transmission circuit or signal separation circuit of the present invention, which include a remote-control receiver 1, a PC 2 and a remote-control receiver 3.

The remote-control receiver 1 comprises a pulse signal generation unit 11 and a signal transmission circuit 12. The pulse generation unit 11 comprises a PC-on signal generation unit and a TV-on signal generation unit. The pulse generation unit 11 generates pulse signals for activating a PC function and a TV function corresponding to a signal transmitted from the remote-control transmitter 3 in the PC 2. The signal transmission circuit 12 transmits two types of pulse signals, a PC-on signal and a TV-on signal, which are generated by the pulse signal generation unit 11, to the PC 2 via a connector, a cable and a connector 22. Specifically, the PC-on signal and TV-on signal are transmitted to the PC 2 via one prescribed signal line of a plurality of signal lines constituting the cable 4.

The PC 2 comprises a signal separation circuit 21. The signal separation circuit 21 separates pulse signals received from the remote-control receiver 1 via the connector 22 according to pulse width. Thus, the PC-on signal and TV-on signal are outputted. The remote-control transmitter 3 comprises a PC power button 31 and a TV power button 32.

When a user presses the PC power button 31 or TV power button 32, which are disposed in the remote-control transmitter 3 in the PC system so configured, the remote-control transmitter 3 transmits a signal for starting the use of a PC function or TV function corresponding to the pressed button. The remote-control receiver 1 detects a signal transmitted from the remote-control transmitter 3 via a radio transmission channel. In this case, this signal includes, for example, a code for identifying an instruction to activate a PC function and an instruction to activate a TV function. When detecting a signal transmitted from the remote-control transmitter 3, the remote-control receiver 1 transmits a pulse signal with a pulse width corresponding to the detected signal toward the PC 2. The signals are transmitted via one signal line. The remote-control receiver 1 and the PC 2 are connected via the cable 4. When receiving a transmitted signal from the remote-control receiver 1, the PC 2 extracts a PC-on signal or a TV-on signal according to the pulse width of the signal and activates a corresponding function (that is, a PC function or a TV function).

FIG. 4 shows the typical pin array of a connector 13, 22. The power-on signal is transmitted via any of 30 pins shown in FIG. 4. In this preferred embodiment, the PC-on signal and TV-on signal are transmitted from the remote-control receiver 1 to the PC 2 via, for example, a pin No. 9. A USB signal, power, a ground, a video signal, an audio signal, control signals and the like, are transmitted via the remaining pins.

The process performed in each device of the remote-control receiver 1 and PC 2 which comprises the signal transmission circuit 12 or signal separation circuit 21 of the preferred embodiment is specifically described below with reference to FIGS. 5 through 8.

FIG. 5 is a flowchart showing the process performed in a remote-control receiver 1. The process shown in FIG. 5 is started when the remote-control receiver 1 detects a signal transmitted from the remote-control transmitter 3. The signal transmitted from the remote-control transmitter 3 to the remote control receiver 1 includes information for identifying the respective activation instructions of a PC function and a TV function. The pulse signal generation unit 11 for performing the process of this flowchart can be realized by, for example, a microcomputer.

Firstly, in step S1, it is determined whether a received signal is a signal for switching the power of the PC on. If the determination is yes, in step S2 a PC-on signal for activating a PC function is generated and the process terminates. If the received signal is another signal, step S2 is skipped and the process proceeds to step S3.

In step S3, it is determined whether the received signal is a signal for switching the power of a TV receiver on. If the determination is yes, in step S4 a TV-on signal for activating a TV function is generated and the process terminates. If the received signal is another signal, in step S5 a process corresponding to the received signal is performed and the process terminates.

Both the PC-on signal generated in step S2 of the flowchart and the TV-on signal generated in step S4 are pulse signals. However, the respective pulse widths of the PC-on signal and TV-on signal are different.

A power-on signal (PC-on signal/TV-on signal) corresponding to the user's instruction to switch power on is generated in the remote-control receiver 1 by the process shown in FIG. 5. The generated power-on signal is provided to the signal transmission circuit 12, and is transmitted to the PC 2 via one signal line. The signal separation circuit 21 provided for the PC 2 separates a PC-on signal from a TV-on signal, based on the difference in pulse width between the power-on signals. The signal transmission circuit 12 provided for the remote control and the signal separation circuit 21 provided for the PC 2 are described below with reference to FIGS. 6A and 6B.

Figure 6A:
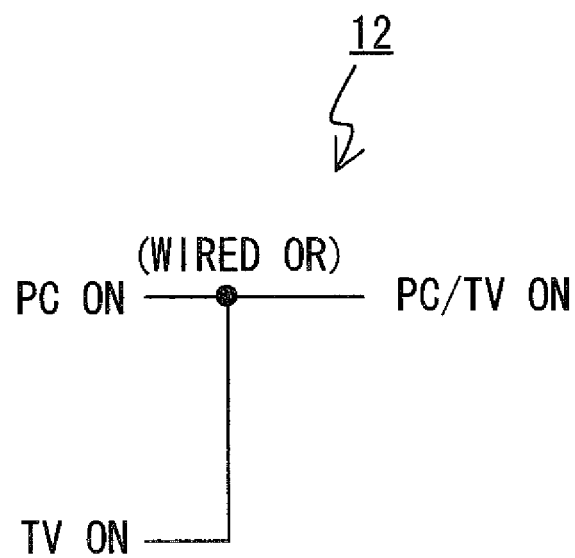
FIG. 6A shows the configuration of the signal transmission circuit of the preferred embodiment.

FIG. 6A shows the configuration of the signal transmission circuit 12. In this preferred embodiment, the signal transmission circuit 12 is realized by a wired OR circuit for mixing or superimposing two types of pulse signals and outputting them to one signal line. The output signal of the wired OR is a PC/TV-on signal in the following description.

FIG. 6B shows the configuration of the signal separation circuit 21. The PC/TV-on signal transmitted from the signal transmission circuit 12 of the remote-control receiver 1 is transmitted to the PC 2 via the cable 4 and inputted to the signal separation circuit 21. The signal separation circuit 21 shown in FIG. 6B comprises an inverter circuit 22, a PC-on signal detection circuit 40 and a TV-on signal detection circuit 50. A signal line for transmitting the PC/TV-on signal is pulled up by a resistor R4.

The inverter circuit 22 inverts the logic of the PC/TV-on signal received from the signal transmission circuit 12 and inputs the signal to the PC-on signal detection circuit 40 and TV-on signal detection circuit 50.

The PC-on signal detection circuit 40 comprises a PC signal integration circuit 41, which comprises a resistor R1 and a capacitor C1, and an inverter circuit 42 for inverting the logic of the output signal of the PC signal integration circuit 41. In this case, the capacitor C1 is charged when an input signal to the PC-on signal detection circuit 40 is "H". Specifically, the capacitor C1 is charged when the PC/TV-on signal is "L". The inverter circuit 42 outputs "H" when the voltage of the capacitor C1 is less than a prescribed threshold voltage (threshold Th1) and "L" when the voltage of the capacitor C1 is equal to or more than the threshold voltage. The signal outputted from the PC-on signal detection circuit 40 is a PC function activation signal for activating the PC function.

The TV-on signal detection circuit 50 comprises a TV signal integration circuit 51, which comprises a resistor R3 and a capacitor C3, a diode D1 connected in parallel to the resistor R2, a resistor R3 and a NAND circuit 52. In this case, the capacitor C2 is charged when an input signal to the TV-on signal detection circuit 50 is "H". Specifically, the capacitor C2 is charged when the PC/TV-on signal is "L". The TV signal integration circuit 51 provides the NAND circuit 52 with "L" when the voltage of the capacitor C2 is less than a prescribed threshold voltage (threshold Th2) and "H" when the voltage of the capacitor C2 is equal to or more than the threshold voltage. The NAND circuit 52 is a 3-input AND gate, which is one form of an AND circuit, and is provided with the output signal of the PC-on signal detection circuit 40, the output signal of the TV signal integration circuit 51 and the inverted signal of the signal input to the TV-on signal detection circuit 50. A signal outputted from the NAND circuit 52 is a TV function activation signal for activating the TV function.

In the above-described configuration, the time needed to charge the capacitor C1 from zero up to the threshold Th1 is set to be longer than the time needed to charge the capacitor C2 from zero up to threshold Th2. For example, the former and latter are approximately 150 ms and 5 ms, respectively. In this case, it is assumed that the capacitances of the capacitors C1 and C2 are, for example, approximately 3.3 µF and 1.0 µF, respectively. It is also assumed that the resistances of the resistors R1, R2 and R3 are, for example, approximately 100 kΩ, 150 kΩ and 10 kΩ, respectively. The thresholds Th1 and Th2 can be the same or different.

FIG. 7 is the logical value table of the input/output signals of the NAND circuit 52. The output signal of the NAND circuit 52 becomes "1 (that is, H)" if any one of the three input signals is "0 (that is, L)". Specifically, if at least one of the PC/TV-on signal propagating through the cable 4, PC activation signal outputted from the PC-on signal detection circuit 40 and a signal B outputted from the TV integration circuit 51 is "0", the output of the NAND circuit 52 becomes "1". In other words, only when all the three signals are simultaneously "1", does the output of the NAND circuit 52 become "0".

FIG. 8 is a timing chart showing the operation of the signal separation circuit 21 of the preferred embodiment. The operation in the cases where a user activates the PC function, using the remote-control transmitter 3 and where the user activates the TV function are described below.

It is assumed that a user presses the PC-on button 31 at time T1. Then, the remote-control receiver 1 generates a pulse with a pulse width of 400 ms and transmits the pulse to the PC 2 via the cable 4. Thus, the PC/TV-on signal is "L" until 400 ms elapse from time T1.

While the PC/TV-on signal is "L", the capacitor C1 continues to be charged. In FIG. 8, the output voltage of the PC signal integration circuit 41 (shown as A in FIG. 6B) continues to rise. When the output voltage of the PC signal integration circuit 41, exceeds the threshold Th1 at time T2, the output of the inverter circuit 42, changes from "H" to "L".

After the PC/TV-on signal returns from "L" to "H" at time T3, the capacitor C1 continues to be discharged. Specifically, the output voltage of the PC signal integration circuit 41 continues to fall. When the output voltage of the PC signal integration circuit 41, falls below the threshold Th1 at time T4, the output of the inverter circuit 42, returns from "L" to "H".

In this way, when a pulse with a pulse width of 400 ms (that is, a PC-on signal) is generated, a falling edge (time T2) and a rising edge (time T4) can be obtained in the output signal of the inverter circuit 42, which is the PC function activation signal. The PC 2 activates the PC function when detecting one of the edges.

If a pulse with a pulse width of 400 ms (that is, PC-on signal) is generated as described above, the capacitor C2 is also charged. In this case, the output voltage of the TV signal integration circuit 51 exceeds the threshold Th1 before time T2, and the NAND circuit 52 is provided with "H". However, while the PC/TV-on signal is "L" (time T1 through T3) and while the PC activation signal outputted from the PC-on signal detection circuit 40 is "L" (time T3 through T4), the output of the NAND circuit 52 is "H". Thus, no edge is generated in the output signal of the NAND circuit 52, which is the TV function activation signal, and the PC 2 does not activate the TV function.

Then, it is assumed that the user presses the TV-on button 32 at time T5. The remote-control receiver 1 generates a pulse with a pulse width of 80 ms and transmits the pulse to the PC 2 via the cable 4. Thus, the PC/TV-on signal is "L" for 80 ms after T5.

While the PC/TV-on signal is "L", the capacitor C1 is charged, and the output voltage of the PC signal integration circuit 41 continues to rise. However, before the output voltage of the PC signal integration circuit 41 reaches the threshold Th1, the PC/TV-on signal returns from "L" to "H" at time T6. Therefore, the output of the inverter circuit 42 remains "H". Thus, no edge is generated in the output signal of the inverter circuit 42, which is the PC function activation signal, and the PC 2 does not activate the PC function.

The integration constant of the TV signal integration circuit 51 is smaller than that of the PC signal integration circuit 41. When the capacitor C2 is charged by the pulse with a pulse width of 80 ms, the output voltage of the TV signal integration circuit 51 exceeds the threshold Th2. Thus, "H" is provided from the TV signal integration circuit 51 to the NAND circuit 52.

After the PC/TV-on signal returns from "L" to "H" at time T6, the capacitor C2 continues to be discharged. Specifically, the output voltage of the TV signal integration circuit 51 continues to fall. The output voltage of the TV signal integration circuit 51 falls below the threshold Th2 at time T7.

In this case, if the period T6 through T7 is focused on, the PC/TV-on signal, the PC activation signal outputted from the PC-on signal detection circuit 40 and the output signal of the TV signal integration circuit 51 all become "H". Thus, during this period, the output of the NAND circuit 52 becomes "L". As a result, an edge is generated in the output signal of the NAND circuit 52, which is the TV activation signal, and the PC 2 activates the TV function.

As described above, when the signal separation circuit 21 of this preferred embodiment receives a pulse signal with a broad pulse width for activating the PC function, only the PC-on signal detection circuit 40 detects the signal. When the signal separation circuit 21 receives a pulse signal with a narrow pulse width for activating the TV function, only the TV-on signal detection circuit 50 detects the signal. Therefore, even when two types of signals each specifying a different function are transmitted via the same signal line, the signal can be appropriately separated. Therefore, two types of signals to indicate different functions can be separated appropriately when they are transmitted via the same signal line. When there is a problem in the accuracy of each component, more particularly the resistors R1, R2 and R3 and the capacitors C1 and C2, the signals can be surely separated by the NAND circuit 52. Since highly accurate components are generally expensive, this preferred embodiment also has a cost reducing effect.

Specifically, the signal transmission circuit 12 and signal separation circuit 21 of this preferred embodiment can generate pulse signals each with a different pulse width in the signal transmission circuit 12 for a PC-on signal and a TV-on signal and transmit the signals to a PC via one signal line. Upon receipt of the pulse signals, the signal separation circuit 21 can extract a signal for activating each function, by utilizing the difference in pulse width.

FIG. 9 shows another configuration of the signal separation circuit. In the configuration shown in FIG. 9, the signal separation circuit differs from the signal separation circuit 21 shown in FIG. 6B in that the signal separation circuit uses a differential circuit as a TV-on signal separation circuit. Even in the configuration shown in FIG. 9, two types of pulse signals each with a different pulse width can be separated and extracted.

Although in the above-described preferred embodiment, two pulse signals each with a different pulse width are used as two types of power-on signals, the present invention is not limited as such. For example, two types of pulse signals each with different amplitude can also be used as two types of power-on signals.

What is claimed is:

1. A signal separation circuit separating a plurality of pulse signals received via the same signal line, the signal separation circuit comprising:
    a first circuit detecting a first pulse signal with a first pulse width from a signal received via the signal line to generate a first output signal corresponding to the first pulse signal;
    a second circuit detecting a second pulse signal with a second pulse width shorter than the first pulse width from the received signal; and
    a third circuit generating a second output signal from the first output signal and an output signal of the second circuit, wherein
    the first circuit comprises
        a first integration circuit which is charged beyond a first threshold voltage by the first pulse signal and is not charged up to the first threshold voltage by the second pulse signal; and
        a first output circuit generating the first output signal when the first integration circuit is charged beyond the first threshold voltage, the second circuit comprises
        a second integration circuit which is charged beyond a second threshold by the second pulse signal and
    the third circuit comprises
        a second output circuit generating the second output signal when the first circuit does not generate the first output signal in an end edge timing of the input pulse signal which contributes to the charge of the second integration circuit after the second integration circuit is charged beyond the second threshold voltage.

2. The signal separation circuit according to claim 1, wherein
    the second output circuit is comprised of an AND circuit to which the output signal of the first integration circuit, the output signal of the second integration circuit and the received signal are inputted.

3. The signal separation circuit according to claim 1, wherein
    the first pulse signal is an activation signal activating one of a personal computer and a television receiver, and the second pulse signal is another activation signal activating the other of the personal computer and television receiver.

* * * * *

UNITED STATES PATENT AND TRADEMARK OFFICE
CERTIFICATE OF CORRECTION

| | |
|---|---|
| PATENT NO. | : 7,880,811 B2 |
| APPLICATION NO. | : 11/460656 |
| DATED | : February 1, 2011 |
| INVENTOR(S) | : Kazunori Takahashi |

It is certified that error appears in the above-identified patent and that said Letters Patent is hereby corrected as shown below:

Title Page, item (54) and Col. 1

The term "SEPERATION" in the title should be changed to --SEPARATION--.

Signed and Sealed this
Nineteenth Day of April, 2011

David J. Kappos
*Director of the United States Patent and Trademark Office*